United States Patent [19]

Hirai et al.

[11] Patent Number: 5,310,852
[45] Date of Patent: May 10, 1994

[54] ELASTIC POLYURETHANE FIBER

[75] Inventors: Koji Hirai; Michihiro Ishiguro; Tatuya Oshita; Setuo Yamashita; Katsura Maeda; Yukiatsu Komiya, all of Kurashiki, Japan

[73] Assignee: Kuraray Co., Ltd., Kurashiki, Japan

[21] Appl. No.: 958,320

[22] PCT Filed: Mar. 18, 1992

[86] PCT No.: PCT/JP92/00539

§ 371 Date: Dec. 21, 1992

§ 102(e) Date: Dec. 21, 1992

[87] PCT Pub. No.: WO92/19800

PCT Pub. Date: Nov. 12, 1992

[30] Foreign Application Priority Data

Apr. 26, 1991 [JP] Japan .................. 3-124839

[51] Int. Cl.$^5$ ............................................. C08G 18/30
[52] U.S. Cl. ........................................ 528/83; 528/906
[58] Field of Search ................................. 528/83, 906

[56] References Cited

U.S. PATENT DOCUMENTS 5,118,780  6/1992  Hirai et al. ..................... 528/83

FOREIGN PATENT DOCUMENTS 0449036 10/1991 European Pat. Off. .
48-25433  7/1973 Japan .
49-21440  5/1974 Japan .
64-6180   1/1989 Japan .
64-52872  2/1989 Japan .

Primary Examiner—Morton Foelak
Attorney, Agent, or Firm—Oblon, Spivak, McClelland, Maier & Neustadt

[57] ABSTRACT

Provided is an elastic polyurethane fiber comprising a polyurethane obtained by copolymerizing a polymer diol (A), an organic diisocyanate (B) and a chain extender (C);
said polymer diol (A) that constitutes the polyurethane being a polyester diol and/or polyesterpolycarbonate diol having an average molecular weight of 1,000 to 6,000, and satisfying the following condition (I);

$$5.4 \leq \frac{\text{total number of carbon atoms}}{\text{numbers of ester bonds and carbonate bonds}} \leq 10.0 \quad (I)$$

wherein the total number of carbon atoms means the number of the carbon atoms contained in the polymer diol and excluding those contained in the ester bonds and carbonate bonds thereof;
the diol units that constitute said polymer diol containing branched diols in an amount of at least 10 mol %;
said polyurethane constituting said elastic fiber satisfying the following conditions (II) and (III)

$$45\% \leq \text{long chain hard segment content} \leq 75\% \quad (II)$$

wherein the long chain hard segment content means the ratio of the amount of long chain hard segments containing at least 3 repeating units from (B) and (C) combinedly, to the amount of total hard segments comprising components (B) and (C) and, linked thereto via urethane bonds, the terminal diol component of (A), the amounts of said three components being determined on the three components taken out by alcoholysis of component (A) of said polyurethane with an alkali-reethanol solution;

$$\text{Retention of long chain hard segment content after heat melting} \geq 85\% \quad (III)$$

wherein the retention of long chain hard segment content after heat melting means the ratio between the contents of long chain hard segments after and before melt-kneading at 230° C. for 60 minutes of said polyurethane constituting said elastic fiber. The fiber is obtained by melt spinning and has excellent resistance to chlorine and light and excellent elastic recovery and resistance to heat and hot water and being dyeable together with polyester fibers under high-temperature, high-pressure conditions.

9 Claims, 1 Drawing Sheet

FIG. 1

ELASTIC POLYURETHANE FIBER

TECHNICAL FIELD

The present invention relates to an elastic polyurethane fiber having excellent resistance to hot water to be dyeable under high-temperature and high-pressure conditions which are commonly used for dyeing polyester fibers. That is, the elastic fibers of the present invention are usable in combination with polyester fibers, besides with nylon or cotton which has been co-used in practice.

BACKGROUND ART

Known processes for producing elastic polyurethane fibers are dry, wet, and melt spinning systems. In recent years, production of elastic polyurethane fibers by melt spinning has been increasing because this process can give fibers having fine deniers and good transparency at relatively low cost.

However, the elastic polyurethane fibers produced by melt spinning have the essential disadvantages of poorer resistance to heat and hot water than that of elastic polyurethane fibers obtained by dry spinning. There has therefore been demanded improvement in resistance to heat and hot water of elastic polyurethane fibers produced by melt spinning.

The present inventors have proposed a melt-spun elastic polyurethane fiber using a branched polyesterpolycarbonate-based polymer diol and having excellent resistance to heat and hot water (see EP 0449036A2) It has been, however, found that the proposed process can, on laboratory scale, yield elastic polyurethane fibers with good properties but cannot always produce fibers having good properties stably on commercial scales.

DISCLOSURE OF THE INVENTION

Accordingly, an object of the present invention is to provide an elastic polyurethane fiber having good resistance to chlorine and light and being excellent in all of elastic recovery and resistance to heat and hot water and, at the same time, dyeable under high-temperature and high-pressure conditions together with polyester fibers.

The present invention provides ah elastic polyurethane fiber comprising a polyurethane obtained by co-polymerizing a polymer diol (A), an organic diisocyanate (B) and a chain extender (C);

said polymer diol (A) that constitutes the polyurethane being a polyester diol and/or polyesterpolycarbonate diol having an average molecular weight of 1,000 to 6,000, and satisfying the following condition (I);

$$5.4 \leq \frac{\text{total number of carbon atoms}}{\text{numbers of ester bonds and carbonate bonds}} \leq 10.0 \quad (I)$$

wherein the total number of carbon atoms means the number of the carbon atoms contained in the polymer diol and excluding those contained in the ester bonds and carbonate bonds thereof;

the diol units that constitute said polymer diol containing branched diols in an amount of at least 10 mol %;

said polyurethane constituting said elastic fiber satisfying the following conditions (II) and (III)

$$45\% \leq \text{long chain hard segment content} \leq 75\% \quad (II)$$

wherein the long chain hard segment content means the ratio of the amount of long chain hard segments containing at least 3 repeating units from (B) and (C) combinedly, to the amount of total hard segments comprising components (B) and (C) and, linked thereto via urethane bonds, the terminal diol component of (A), the amounts of said three components being determined on the three components taken out by alcoholysis of component (A) of said polyurethane with an alkalireethanol solution;

$$\text{Retention of long chain hard segment content after heat melting} \geq 85\% \quad (III)$$

wherein the retention of long chain hard segment content after heat melting means the ratio between the contents of long chain hard segments after and before melt-kneading at 230° C. for 60 minutes of said polyurethane constituting said elastic fiber.

BRIEF DESCRIPTION OF THE DRAWING

The structures of hard segments shown by 0 through 5 in FIG. 1 are as follows.

| | |
|---|---|
| 0: MPD-MDI-MPD | (n = 0) |
| 1: MPD-(MDI-BD)$_1$-MID-MPD | (n = 1) |
| 2: MPD-(MDI-BD)$_2$-MID-MPD | (n = 2) |
| 3: MPD-(MDI-BD)$_3$-MID-MPD | (n = 3) |
| 4: MPD-(MDI-BD)$_4$-MID-MPD | (n = 4) |
| 5: MPD-(MDI-BD)$_n$-MID-MPD | (n $\geq$ 5) |

BEST MODE FOR CARRYING OUT THE INVENTION

In the present invention, adjustment of the apparent rate constant of urethanization reaction of the polymer diol is one of the means to satisfy the conditions (II) and (III). Thus, the apparent reaction rate constant, k, of urethanization of the polymer diol with 4,4'-diphenylmethane diisocyanate (MDI) at 90° C. is important. Among the components (A), (B) and (C) constituting the polyurethane of the elastic fiber of the present invention, components (B) and (C), combinedly, constitute the hard segments. The term "hard segments" in the present invention includes not only components (B) and (C) combinedly, containing urethane bonds, but also parts linked thereto via the urethane bonds formed by reaction of their terminal isocyanate groups with the terminal diol groups of component (A). Here, the amounts of the components (B) and (C) and the parts linked thereto are determined on the components and parts taken out after swelling the elastic fiber of the present invention with a small amount of tetrahydrofuran (THF) and treating the swollen fiber with a 0.01N KOH solution in methanol with stirring at 50° C. for 5 days to decompose component (A) by alcoholysis completely. That is, the hard segments include all compounds having organic diisocyanate skeletons and their urethane bonds, being present after the above alcoholysis. The long chain hard segment content in the present invention means the ratio of the amount of long chain hard segments having at least 3 repeating units from (B) and (C) combinedly, to the total amount of the hard segments thus taken out.

It is important that the long chain hard segment content be at least 45% and not more than 75%. If the content is less than 45%, the resultant fiber will have very poor resistance to heat and hot water and also have poor durability. If the content exceeds 75%, the resultant fiber, having good resistance to heat, will have a low elongation and elastic recovery and further will cause many troubles in after-processing operations.

The retention of long chain hard segment content after heat melting herein means the ratio of the content of long chain hard segments in a polyurethane after being kneaded in the following manner to the original polyurethane. The kneading procedure comprises dehydrating the polyurethane constituting the elastic fiber and then kneading it in melted state at 230° C. for 60 minutes using a Plastograph (manufactured by Brabender Inc.). The long chain hard segment content and its retention after heat melting are dependent on the concentrations of ester bonds and carbonate bonds in the polymer diol and the apparent rate constant (k) of reaction of the polymer diol with MDI. Elastic fibers having a retention of long chain hard segment content of not more than 85% have, even if the long chain hard segment content is increased to 45% or more, very poor resistance to heat and hot water and are rigid, having low elongation and elastic recovery. Such fibers further have large dispersion in fiber properties. In particular, in order to maintain the residual stress (R) of the elastic fiber at at least 0.0075 g/denier after it has been treated with hot water at 130° C. for 30 minutes under 200% elongation and to assure good resistance to heat and hot water, it is necessary that the long chain hard segment content be at least 48% and, at the same time, the retention of long chain hard segment content after heat melting be at least 90%.

The elastic fiber described in EP 0449036A2 was obtained by conducting both polymerization and the subsequent melt spinning of the polyurethane on a pilot plant scale. The fiber had good resistance to heat and hot water by virtue of rather short melting residence time of about 10 to 20 minutes. It has, however, then revealed that, in commercial production requiring a long melting residence time of about 40 to 60 minutes, the fiber properties such as resistance to heat and hot water decrease and the dispersion in fiber qualities between fiber production lots increases. The present inventors have intensively studied on the mechanism of the above phenomena and how to improve them. As a result, it has been found that incomplete deactivation of the catalyst used in the production of the raw material polymer diol for the polyurethane reduces the long chain hard segment content of the polyurethane with elapse of time during heat melting at an elevated temperature, whereby the resistance to heat -and hot water decreases. Sufficient deactivation of the catalyst in the production of polymer diol, together with the use of a polymer diol satisfying the following condition, stabilizes the properties and performance of the resulting elastic fiber even when the melting residence time for polymerization and fiber spinning exceeds 60 minutes:

$$0 < k \leq 0.0652X - 0.152 \ (5.4 \leq X \leq 10)$$

wherein k represents the apparent rate constant of reaction of the polymer diol with MDI, and X represents (total number of carbon atoms of the polymer diol)/(numbers of ester bonds and carbonate bonds). Then, the resultant elastic fiber has a very little yarn breakage during spinning and unevenness and improved resistance to heat and hot water. The fiber further possess improved processability upon high-temperature dyeing with disperse dyes, thus exhibiting improved overall fiber properties. It has become possible to produce stably on commercial scale elastic fibers which are dyeable in combination with polyester fibers. It has also become clear that: in order to exert the aforementioned effects more clearly and markedly, it is important, along with the decrease in apparent rate constant of reaction, the amounts of ester bonds and carbonate bonds in polymer diol fall within the range specified in the present invention, i.e., satisfy the condition (I).

Accordingly, the elastic fiber of the present invention has, after being melt kneaded at 230° C. for 30 minutes, a retention of long chain hard segment content of 85% or more and satisfies the conditions (II) and (III).

In other wards, polyurethanes utilizing a polymer diol having an apparent reaction rate constant, k, and a ratio of the total number of carbon atoms to the numbers of ester bonds and carbonate bonds, X, not satisfying the conditions given below have, after being melt spun, a reduced long chain hard segment content, so that the resulting elastic fibers have poor resistance to heat and hot water, $$0 < k \leq 0.0652X - 0.152 \ (5.4 \leq X \leq 10)$$

To improve the resistance to heat and hot water and also the elastic recovery and elongation of an elastic polyurethane fiber, it is important that the polyurethane constituting the elastic fiber have a decreased hard segment content and have a long chain hard segment content of at least 45%. For this purpose, it becomes, in turn, important to use a polymer diol having concentrations of ester bonds and carbonate bonds that satisfy the following condition (I) specified in the present invention $$5.4 \leq \frac{\text{total number of carbon atoms}}{\text{numbers of ester bonds and carbonate bonds}} \leq 10.0 \quad (I)$$

and, at the same time, satisfying the following conditions $$0 < k \leq 0.0652X - 0.152 \ (5.4 \leq X \leq 10)$$

wherein k represents the apparent rate constant of reaction of the polymer diol with MDI, and X represents (the total number of carbon atoms in the polymer dial)/(the numbers of ester bonds and carbonate bonds). If the polymer diol used cannot satisfy the condition (I), i.e. X is less than 5.4, the resultant polyurethane fiber will have low resistance to heat and hot water even when k is small on the other hand, if X exceeds 10.0, the resulting elastic fiber will have very low elastic recovery at low temperatures and, in addition, have very poor spinnability, thereby causing very frequent yarn breakages. The urethanization reaction rate is proportional to each of the concentrations of hydroxyl group and isocyanate group. The rate constant of the reaction is therefore determined as follows.

The polymer diol to be tested and MDI are placed in a vessel in a molar ratio of polymer diol/MDI of 3/1, and the mixture is stirred with the temperature being maintained at 90° C. Test samples are taken from the reaction mixture at intervals and dissolved by addition of a predetermined amount of a 0.01N solution of di-n-butylamine in DMF. The obtained solutions are subjected to neutralization titration with a 0.01N hydrochloric acid solution in reethanol using an indicator of bromophenolblue, to determine the amounts of residual isocyanate groups. The apparent rate constant of the reaction k is calculated according to the following equation for determining the apparent rate constant of second order reaction:

$$\frac{1}{a-b} \ln \frac{b(a-x)}{a(b-x)} = kt$$

wherein k represents the apparent rate constant of the reaction, t the reaction time (in minutes), a the initial hydroxyl group concentration [OH], b the initial isocyanate group concentration [NCO] and x the urethane group concentration [NHCOO] at the time of t.

In order to decrease the apparent reaction rate constant of a polymer diol, there are available, for example, a method comprising adding water in an amount of 1.0 to 4.0% based on the amount of the polymer diol and heating the mixture at 80° to 150° C. for about 2 hours with stirring, and once comprising passing steam at 100 to 150° C. with stirring.

The polymer diol used in the present invention preferably has a molecular weight in the range of 1,000 to 6,000. For further increasing the resistance to heat and hot water, the molecular weight of the polymer diol is more preferably at least 1,600. According to the present invention, in view of spinnability of the resulting polyurethane and of elongation and elastic recovery of the elastic fiber, the molecular weight of the polymer diol is preferably not more than 6,000, more preferably not mare than 5,000.

The polymer diol used in the present invention is a polyester diol and/or a polyesterpolycarbonate diol comprising the following diol units —R$_1$—O— wherein wherein R$_1$ represents a divalent organic group, and the following dicarboxylic acid units wherein R$_2$ represents a divalent organic group, or the above polyesterpolycarbonate diol further comprising the following carbonyl units the dicarboxylic acid units or carbonyl units having diol units bonded to both ends thereof.

Examples of the diol used in the present invention that provides the above diol units are 1,4-butanediol, 1,5-pentanediol, 1,6-hexanediol, 1,7-heptanediol, 1,8-ocatanediol, 1,9-nonanediol and 1,10-decanediol. Examples of preferred branched diols usable in the present invention are 2-methyl1,3-propanediol, neopentyl glycol, 3-methyl-1,5-pentanediol and 2-methyl-1,8-octanediol. In order to improve resistance to heat and hot water, branched long chain diols are preferable, among which 3-methyl-1,5-pentanediol and 2-methyl-1,8-octanediol are particularly preferable.

Examples of compounds that can provide the above dicarboxylic acid units are saturated aliphatic dicarboxylicacids having 5 to 12 carbon atoms or aromatic dicarboxylic acids, such as glutaric acid, adipic acid, pimelic acid, suberic acid, azelaic acid, sebacic acid, decanedicarboxylic acid, isophthalic acid and terephthalic acid. Preferable examples of the compounds are aliphatic dicarboxylic acids, in particular adipic acid, azelaic acid, sebacic acid and decanedicarboxylic acid.

According to the present invention, it is possible to use polyester diols or polycarbonate diols such as poly-ε-caprolactone diol and poly-β-methylvalerolactone diol in combination with the aforementioned diols. In this case also, it is necessary that the ratio (X) between the total number of carbon atoms to the numbers of ester bonds and carbonate bonds-fall within the range of:

$$5.4 \leq X \leq 10.0$$

Preferred examples of compounds that can provide the above carbonyl units are dialkyl carbonates, diaryl carbonates and alkylene carbonates.

In accordance with the present invention, where 2 or more polymer diols are used, there are included the cases where, in additions to those polymer diols being used in mixed state, polyurethanes having been separately. polymerized are mixed and used.

In the case of combination of a diol with a dicarboxylic acid, in any event, the following condition must be satisfied.

$$5.4 \leq \frac{\text{total number of carbon atoms}}{\text{numbers of ester bonds and carbonate bonds}} \leq 10.0 \quad (1)$$

If the above ratio is less than 5.4, the resultant elastic fiber will have poor resistance to heat and hot water. if the ratio exceeds 10.0, the resultant polyurethane will have poor spinnability and the resultant elastic fiber will have poor resistance to cold and elastic recovery and low elongation. Preferably:

$$5.5 \leq \frac{\text{total number of carbon atoms}}{\text{numbers of ester bonds and carbonate bonds}} \leq 9$$

As the ratio of the total number of carbon atoms to the numbers of ester bonds and carbonate bonds of polymer diol increases, it becomes important to maintain the ratio of branched diols to total diols at at least 10 mol %. If the ratio of branched diols to total diols is less than 10 mol %, the resultant elastic fiber will have very poor resistance to cold and very low elastic recovery. In particular, to maintain an instantaneous elastic recovery of at least 0.8, the ratio of branched diols to total diols is preferably at least 20 mol %. Examples of branched diols usable in the present invention are those having at least one methyl branch and at least 4 carbon atoms, as described for the aforementioned diols, among which those having one methyl branch and at least 6 carbon atoms are particularly preferred. Low concentrations of ester bonds and carbonate bonds are important in improving resistance to heat and hot water. On this occasion, use of branched diols in a large amount reduces, reversely, resistance to heat and hot water. Proper selection of branched diols is therefore very important. Where it is required that a branched diol be used in an amount of at least 20%, in particular in an amount of at least 30%, 3-methyl-1,5-pentanediol is most preferably used in view of assuring good resistance to heat and hot water.

The polyester diol used in the present invention can be produced by known processes for producing polyethylene terephthalate or polybutylene terephthalate, i.e. transesterification or direct esterification, followed by melt polycondensation.

There are no specific restrictions, either, with respect to the process for producing the polyesterpolycarbonate diol used in the present invention. For example, there may be employed a process which comprises feeding a diol, a dicarboxylic acid and a carbonate at the same time and subjecting the mixture to the known process of direct esterification or transesterification, followed by polycondensation. Or, a polyester diol or a polycarbonate is synthesized beforehand, which is then reacted with a carbonate or a diol and a dicarboxylic acid, respectively.

There are no particular limitation to the process for producing the polycarbonate diol used in the present invention. Examples of preferred carbonates usable for producing the polycarbonate diol are dialkyl carbonates, diaryl carbonates and alkylene carbonates.

Diisocyanates suitably used in the present invention are aromatic, aliphatic and alicyclic diisocyanates, and their examples are those having a molecular weight of not more than 500, e.g. 4,4'-diphenylmethane diisocyanate, p-phenylene diisocyanate, tolylene diisocyanate, 1,5-naphthalene diisocyanate, xylylene diisocyanate, hexamethylene diisocyanate, isophorone diisocyanate and 4,4'-dicyclohexylmethane diisocyanate, among which 4,4'-diphenylmethane diisocyanate is particularly preferred.

Chain extenders known in polyurethane industry are also usable in the present invention. They are low molecular weight compounds having a molecular weight of not more than 400 and having at least 2 hydrogen atoms reactable with isocyanate, for example diols, e.g. ethylene glycol, 1 4-butanediol, propylene glycol, 3-methyl-1,5-pentanediol, 1,4-bis(2-hydroxyethoxy)benzene, 1,4-cyclohexanediol, bis (β-hydroxyethyl) terephthalate and xylylene glycol. These compounds may be used alone or in combination. The most preferred chain extenders are 1,4-butanediol and/or 1,4-bis(2-hydroxyethoxy)benzene.

For the production of the polyurethane used in the present invention by reacting a polymer diol, an organic diisocyanate and a chain extender, known processes for urethanization can also be used. As a result of a study by the present inventors, it has been found that among known processes melt polymerization in the substantial absence of inert solvent is preferable, in particular, continuous melt polymerization through a multi-screw extruder.

The polyurethane used in the present invention substantially comprises structural units of:

(a) a divalent unit comprising a polymer diol with its both terminal hydroxyl groups of which 2 hydrogen atoms have been removed;

(b) a 2- to 4-valent unit derived from an organic diisocyanate and represented by the following formula wherein R is a divalent organic group; and (c) a divalent unit comprising a chain extender at both ends of which 2 hydrogen atoms reactable with diisocyanate have been removed. Here, the structural units (a) and (c) form urethane bonds with (b) and it is considered that part of structural units (b) are bonded to part of another structural units (b) through allophanate bonds. The polyurethane thus obtained may be once pelletized and then the pellets may then be melt spun; or the polyurethane obtained by melt polymerization may, as melted, be directly melt spun through spinnerets. The latter direct melt spinning process is preferred from the viewpoint of stable spinnability. Where the elastic polyurethane fiber of the present invention is produced by melt spinning, it is desirable in practice to employ a spinning temperature of not more than 250° C., more preferably in a range of 200° to 235° C.

The elastic polyurethane fibers thus obtained are used in the actual applications as they are or as core yarns covered with other fibers. Known fibers such as polyamide fibers, wool, cotton and polyester fibers are usable for this purpose and among these fibers polyester fibers are most preferably used in the present invention.

The elastic polyurethane fiber of the present invention includes those containing a disperse dye with dyeing affinity in an amount of 0.01% by weight or more. The elastic polyurethane fiber of the present invention is permitted to contain a disperse dye by, for example, a process which comprises processing the elastic polyurethane fiber while mixing it with polyester fiber and then dyeing the mixture with a disperse dye at a temperature of 110° to 130° C. The elastic polyurethane fiber of the present invention is a novel, unique material that will, even when dyed at 110° to 130° C., undergo no yarn breakage and keep good resistance to heat and hot water and excellent elastic recovery. Further the elastic polyurethane fiber of the present invention has the marked feature of exhibiting excellent color fastness when dyed either in light or deep color.

The disperse dyes usable in the present invention will be described below. The disperse dyes are used for the purpose of dyeing the elastic polyurethane fiber of the present invention to the same color as that of the fibers mixed therewith and improving the visual indistinguishability and color reproducibility. Known disperse dyes of quinone-type and azo-type can be used for these purposes.

The disperse dyes having dyeing affinity for the elastic fiber of the present invention are those with which, when any optional elastic fiber of the present invention is dyed at 130° C. for 60 minutes to 2% owf, reduction-cleaned, washed with water and dried, at least 40% by weight (determined by weight loss) of the exhausted amount remains on the fiber.

That is, a disperse dye is judged for the dyeing affinity for any optional elastic fiber of the present invention by conducting test dyeing.

Reduction cleaning condition in the above procedure:

| | |
|---|---|
| sodium hydrosulfite | 3 g/liter |
| soda ash | 2 g/liter |
| Amiladin* | 1 g/liter |
| bath ratio | 1:30 |
| temperature | 80° C. × 20 min. |

(*A soaping agent made by Dai-Ichi Kogyo Seiyaku Co., Ltd.)

No polyester-based elastic polyurethane fibers that are now commercially available can withstand high-temperature, high-pressure dyeing at a temperature of 110° C. or above, or at least can be used in combination with polyester fibers requiring high-temperature, high-pressure dyeing at a temperature of 110° C. or above. When conventional elastic polyurethane fibers are dyed at a temperature of less than 110° C., they are difficult to be dyed to deep colors or, if dyed at all, the fibers have a very poor color fastness. "No conventional polyurethane fibers can withstand hightemperature, high-pressure dyeing at a temperature of 110° C. or above" means that such fibers fuse or lose their elastic properties when subjected to high-temperature, high-pressure dyeing at 110° C. or above. On the other hand, the elastic ester-based polyurethane fibers of the present invention can be dyed under high pressure and at an elevated temperature of 110° to 130° C. as described above, thereby exhibiting excellent color fastness, which is another effect produced by the present invention.

The elastic polyurethane fibers of the present invention can be used in combination with polyester fibers, which has so far been impossible. Thus, the elastic polyurethane fibers of the present invention can be formed into core yarns covered with polyester fibers dyeable at high temperatures and into fabrics comprising themselves and polyester fibers.

The elastic polyurethane fibers of the present invention are used in the following applications.

Clothing: swimsuits, skiwears, cycling wears, leotards, lingeries, foundation garments and underwears;

Clothing-miscellaneous: panty-hoses, stockings, caps, gloves, power-nets and bandages Non-clothing: gut for tennis racket, ground thread for integrally molded car seat and metal-covered yarn for robot arm.

The invention is explained in detail by reference to Examples.

In the Examples and Comparative Examples that follow, the long chain hard segment content, retention of long chain hard segment content after heat melting, resistance to hot water (stress=R) and instantaneous elastic recovery ratio of samples were measured according to the following methods.

Long chain hard segment content

Two (2) grams of an elastic fiber sample is subjected to ultrasonic cleaning in 50 ml of n-hexane for 2 hours and dried. From the sample 1.50 grams is weighed exactly and then swollen by addition of 5 ml of THF. After 2 hours, 25 ml of 0.01N KOH solution in methanol is added and the mixture is stirred at 50° C. for 5 days, to decompose the polymer diol of the sample by alcoholysis completely. After the complete decomposition, the solvent is distilled off at 50° C. within 2 hours and the residue is placed in 1000 ml of water, to precipitate the hard segments. The precipitated hard segments are collected by filtration with a filter paper. The hard segments thus taken out are subjected to GPC analysis. The long chain hard segment content, i.e. the ratio between the amount of long chain hard segments (hard segments containing at least 3 repeating units from, combinedly, organic diisocyanate and chain extender) and the amount of total hard segments, is obtained from the ratio between the corresponding GPC peak areas.

GPC analysis for hard segments

The hard segments separated as described above are sufficiently dried and then made homogeneous. From this sample 0.02 gram is weighed out and dissolved in a mixed solvent of 2.0 ml of NMP and 6.0 ml of THF. For GPC measurement, the following apparatus and columns are used.

Shimadzu high-performance liquid chromatograph LC-9A

Shimadzu column oven CTO-6A (40° C.)

Figure 1:
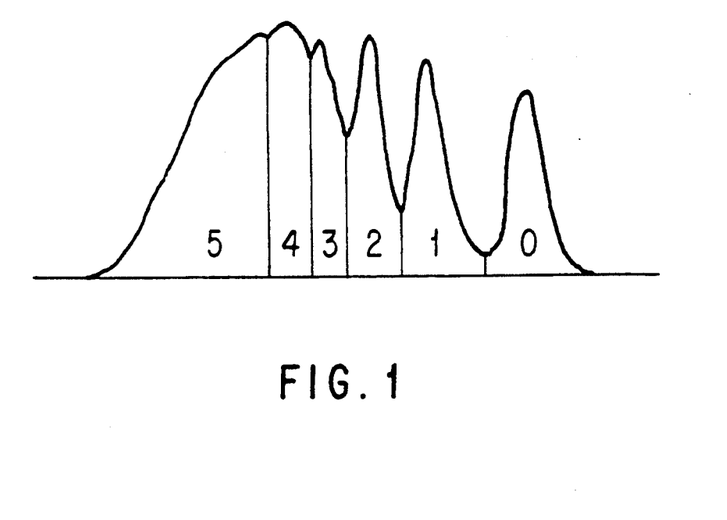
FIG. 1 shows an example of hard segment chain-length distribution (GPC chart) of an elastic fiber according to the present invention (obtained in Example 9). The numbers at the peaks in FIG. 1 show the number of repetition of combined units of 4,4'-diphenylmethane diisocyanate (MDI) and butanediol (BD) which is the basic component of the hard segments. The peak 5 includes all units repeating at least 5 times.

Shimadzu differential refractometer detector for high-performance liquid chromatograph RID-6A Shimadzu chromatopack C-R4A Column:
  Shodex GPC Ad-802/S
  Shodex GPC Ad-802.5/S Twenty (20)μl of sample (adjusted with injector) is tested. The flow rate of medium (THF) is 1.0 ml/min. After GPC analysis, the area between the elution curve and base line on the chart is measured. For two peaks not clearly splitting into separate ones, the area under them is divided vertically as shown in FIG. 1. When a mixture of two or more species of chain extenders and/or diisocyanates is used, sometimes each of the peaks of the obtained elution curve may have a shoulder. These shoulders usually do not hinder the above division procedure for the peaks.

Retention of long chain hard segment content after heat melting

One hundred (100) grams of an elastic fiber sample is ultrasonically cleaned in 5000 cc of n-hexane for 10 minutes. From the cleaned sample 90 grams is dried or dehydrated at 90° C. for 24 hours in vacuo. The dehydrated sample is melt-kneaded under a nitrogen atmosphere at 230° C. for 60 minutes with a Plastograph (manufactured by Bravender Inc.) The hard segments are separated from the sample by the same alkaline decomposition method. The retention of long chain hard segment content after heat melting is represented by the ratio between the content of the long chain hard segments containing at least 3 repeating units after this heat melting and that before heat melting.

Resistance to hot water

An elastic fiber sample is elongated using a wooden frame to 200% and treated as in hot water at 130° C. for 30 minutes. The tensile stress of the sample as it is elongated is measured with an Instron Tensile Tester. The resistance to hot water is represented in terms of the tensile stress R.

Instantaneous elastic recovery ratio

An elastic fiber specimen is tested for instantaneous recovery from 200% elongation at −10° C. and 20° C., separately. The instantaneous elastic recovery ratio is expressed in terms of the ratio between the instantaneous elastic recovery at −10° C. and that at 20° C. The instantaneous recovery itself means recovery exhibited by the specimen having been elongated to 200% and maintained at that state for 2 minutes, immediately after removal of tensile stress. (JIS L-1096 is applied.)

Instantaneous elastic recovery = $100 \times [nl - (l' - 1)]/nl$ wherein n represents the elongation ratio and 1 and 1' represent the initial length and that after removal of the tensile stress -of specimen respectively. The rates of elongation and removal of the tensile stress are both 500 mm/min.

Instantaneous elastic recovery ratio =

$$\frac{\text{(Instantaneouss elastic recovery at } -10° \text{ C.)}}{\text{(Instantaneous elastic recovery at } 20° \text{ C.)}}$$

The compounds used in Examples are abbreviated as shown in Table 1.

TABLE 1

| Abbreviation | Compound |
|---|---|
| BD | 1,4-butandiol |
| EG | ethylene glycol |
| HD | 1,6-hexanediol |
| MPD | 3-methyl-1,5-pentanediol |
| ND | 1,9-nonanediol |
| MOD | 2-methyl-1,8-octanediol |
| AD | adipic acid |
| AZ | azelaic acid |
| SA | sebacic acid |
| DA | 1,10-decanedicarboxylic acid |
| MDI | 4,4'-diphenylmethane diisocyanate |

Reference, Example 1 (Preparation of polyester diol)

A mixture comprising 1,180 grams of 3-methyl-1,5-pentanediol, 354 grams of 1,6-hexanediol and 1,880 grams of azelaic acid (molar ratio of MPD/HD/AZ=1/0.3/1) was placed in a reaction vessel and was heated at about 195° C. under normal pressure, with nitrogen gas being flown into the vessel, to undergo esterification while the water that formed was being distilled off. When the acid value of the polyester decreased to about 10 or less, tetraisopropyl titanate was added as catalyst in an amount of 20 ppm based on the polyester and then the reaction vessel was gradually evacuated with a vacuum pump to accelerate the reaction, and a polyester diol having a molecular weight of 2,000 was obtained. The reaction mixture was cooled to 100° C. and water was added to the reaction mixture in an amount of 3% based on the polyester diol formed, to deactivate the titanate catalyst. After the deactivation the water added was distilled off under reduced pressure, to obtain polyester diol A having a molecular weight of 2,000. The apparent rate constant of the reaction of the thus obtained polyester diol A with MDI at 90° C. was found to be 0.05 (liter/mole-min). The apparent reaction rate constant was determined according to the method described above.

REFERENCE EXAMPLE 2

An esterification reaction was conducted following the same procedure as that described in Reference Example 1 except that the amount of water added to deactivate the titanate catalyst was 0.5% based on the produced polyester diol, to obtain a polyester diol having a molecular weight of 2,000 (polyester diol B). The apparent reaction rate constant was 0.6 (liter/mole-min).

REFERENCE EXAMPLES 3 THROUGH 15

Esterification reactions were conducted following the same procedure as that described in Reference Example 1 except that acid components and diol components as shown in Table 2 were used and that the amounts of water added were 3, 0.7 and 0%, respectively, to obtain polyester diols having a molecular weight of 2,000 or 3,500 (polyester diols C through O). The apparent reaction rate constants are also shown in Table 2.

In Table 2, X represents the value of (total number of carbon atoms)/(numbers of ester bonds and Carbonate bonds), and the amount of water added (%) is expressed in terms of percent by weight based on the polymer diol.

Reference Example 16 (Preparation of polyesterpolycarbonate diol)

A mixture comprising 833 grams of 3-methyl-1,5-pentanediol (MPD), 612 grams of sebacic acid and 267 grams of ethylene carbonate was heated in a reaction vessel with nitrogen gas being flown thereinto, and ethylene glycol and water were distilled off from the reaction zone at 160° C. After the ethylene glycol and water had been mostly removed, tetraisopropyl titanate was added to the reaction mixture in an amount of 15 ppm and then the reaction vessel was evacuated and polycondensation was further effected under a pressure of 2 to 10 mmHg. As a result, a polyesterpolycarbonate diol having a molecular weight of 1,800 was obtained. The reaction mixture was cooled to about 100° C. and water was added in an amount of 3% based on the polyesterpolycarbonate diol. The mixture was stirred for 2 hours to deactivate the titanate catalyst. After the deactivation, the water added was distilled off under reduced pressure, to obtain a polyesterpolycarbonate diol having a molecular weight of 2,100 (polyesterpolycarbonate P). The apparent reaction rate constant was found to be 0.05 (liter/mole-min).

Reference Examples 17 through 20

Esterification reactions were conducted following the same procedure as that described in Reference Example 16 except that acid components and diol components as shown in Table 2 were used and that the amounts of water added for deactivation were of 3, 0.7 and 0%, respectively, to obtain polyesterpolycarbonate diols having a molecular weight of 2,100 as shown in Table 2 (polyesterpolycarbonate diols Q through T).

TABLE 2

| | Polymer diol | Acid Component | Diol Component (molar ratio) | X | Apparent reaction rate constant (l/mol · min) | Amount of water added (%) | Number average molecular weight |
|---|---|---|---|---|---|---|---|
| Ref. Ex. 1 | Polyester diol A | AZ | MPD/HD (77/23) | 6.93 | 0.05 | 3.0 | 2000 |
| Ref. Ex. 2 | Polyester diol B | AZ | MPD/HD (77/23) | 6.93 | 0.60 | 0.5 | 2000 |

TABLE 2-continued

| | Polymer diol | Acid Component | Diol Component (molar ratio) | X | Apparent reaction rate constant (l/mol · min) | Amount of water added (%) | Number average molecular weight |
|---|---|---|---|---|---|---|---|
| Ref. Ex. 3 | Polyester diol C | SA | MPD | 7.45 | 0.05 | 3.0 | 2000 |
| Ref. Ex. 4 | Polyester diol D | AD | HD | 5.36 | 0.04 | 3.0 | 2000 |
| Ref. Ex. 5 | Polyester diol E | AZ | HD | 6.93 | 0.32 | 0.8 | 2000 |
| Ref. Ex. 6 | Polyester diol F | AZ | MPD | 6.75 | 0.06 | 3.0 | 2000 |
| Ref. Ex. 7 | Polyester diol G | AD | MPD/ND (80/20) | 5.71 | 0.04 | 3.0 | 2000 |
| Ref. Ex. 8 | Polyester diol H | AD | ND/MOD (50/50) | 7.16 | 0.05 | 3.0 | 2000 |
| Ref. Ex. 9 | Polyester diol I | SA | MPD | 7.45 | 0.38 | 0.7 | 2000 |
| Ref. Ex. 10 | Polyester diol J | SA | MPD | 7.45 | 0.85 | 0 | 2000 |
| Ref. Ex. 11 | Polyester diol K | DA | MPD | 8.50 | 0.15 | 3.0 | 2000 |
| Ref. Ex. 12 | Polyester diol L | AD | EG | 3.09 | 0.03 | 3.0 | 2000 |
| Ref. Ex. 13 | Polyester diol M | AD | BD | 4.21 | 0.07 | 3.0 | 2000 |
| Ref. Ex. 14 | Polyester diol N | DA | MPD | 8.50 | 0.35 | 2.0 | 2000 |
| Ref. Ex. 15 | Polyester diol O | AD/AZ (50/50) | MPD | 6.12 | 0.18 | 2.0 | 2000 |
| Ref. Ex. 16 | Polyesterpolycarbonate diol P | SA | MPD | 6.98 | 0.05 | 3.0 | 2100 |
| Ref. Ex. 17 | Polyesterpolycarbonate diol Q | SA | MPD | 6.98 | 0.40 | 0.7 | 2100 |
| Ref. Ex. 18 | Polyesterpolycarbonate diol R | SA | MPD/HD (70/30) | 6.98 | 0.03 | 3.0 | 2100 |
| Ref. Ex. 19 | Polyesterpolycarbonate diol S | DA | MPD | 7.51 | 0.04 | 3.0 | 2100 |
| Ref. Ex. 20 | Polyesterpolycarbonate diol T | SA | MPD | 6.98 | 0.90 | 0 | 2100 |

EXAMPLE 1

Continuous melt polymerization was conducted by continuous feeding polyester diol A and 1,4-butanediol each heated at 80° C. and MDI heat melted at 50° C. to a twin-secrew extruder each with a metering pump at such rates as to make the compositions as shown in Table 3. The polyurethane formed was extruded into water to form strands, which were then cut into pellets. The pellets were dried at 80° C. for 20 hours in vacuo, and then spun through a conventional spinning machine equipped with a single-screw extruder at a spinning temperature of 215° C. and a spinning speed of 500 m/min, to give an elastic yarn having a fineness of 40 deniers. The yarn thus obtained was heat treated at 80° C. for 20 hours under a low humidity condition, and further continuously aged at room temperature for 3 days under a humidity of 60%. The yarn was then tested for various properties and the results are preferable as shown in Table 3.

The elastic yarn was alkaline decomposed and the hard segments taken out were subjected to GPC analysis.

The long chain hard segment content and the retention of long chain hard segment content were determined and the results are also shown in Table 3.

EXAMPLES 2 THROUGH 11

Example 1 was repeated to synthesize polyurethanes having compositions as shown in Table 3. The polyurethanes thus obtained were each, as it is without pelletization, fed to a spinning head and spun therethrough at a spinning temperature of 210° to 225° C. and at a spinning speed of 500 m/min, to give an elastic yarn of 80 denier/2 filaments. The yarns thus obtained were heat treated and aged in the same manner as in Example 1 and then tested for various properties in the same manner. The results are shown in Table 3.

TABLE 3

| | Polymer diol (mole) | Organic diisocyanate (mole) | Chain extender (mole) | Elongation (%) | Resistance to hot water R (g/d) | Instantaneous recovery ratio | Long chain hard segment content (%) | Retention of long chain hard segment content after melt heating, (%) |
|---|---|---|---|---|---|---|---|---|
| Ex. 1 | Polyester diol A (1.0) | MDI (2.9) | BD (1.8) | 490 | 0.013 | 0.97 | 61 | 100 |
| Ex. 2 | Polyester diol C (1.0) | MDI (2.9) | BD (1.8) | 480 | 0.014 | 0.95 | 61 | 98 |
| Ex. 3 | Polyester diol F (1.0) | MDI (3.6) | BD (2.45) | 480 | 0.018 | 0.96 | 70 | 100 |
| Ex. 4 | Polyester diol G (1.0) | MDI (2.9) | BD (1.8) | 490 | 0.011 | 0.96 | 59 | 98 |
| Ex. 5 | Polyester diol H (1.0) | MDI (2.9) | BD (1.8) | 450 | 0.013 | 0.85 | 60 | 98 |
| Ex. 6 | Polyester diol K (1.0) | MDI (2.9) | BD (1.8) | 450 | 0.016 | 0.89 | 62 | 103 |
| Ex. 7 | Polyester diol N (1.0) | MDI (2.9) | BD (1.8) | 460 | 0.015 | 0.89 | 61 | 96 |
| Ex. 8 | Polyester diol O (1.0) | MDI (2.9) | BD (1.8) | 490 | 0.011 | 0.96 | 59 | 97 |
| Ex. 9 | Polyesterpolycarbonate diol P (1.0) | MDI (2.9) | BD (1.8) | 440 | 0.014 | 0.94 | 62 | 100 |
| Ex. 10 | Polyesterpolycarbonate diol R (1.0) | MDI (2.9) | BD (1.8) | 430 | 0.014 | 0.94 | 62 | 98 |
| Ex. 11 | Polyesterpolycarbonate diol S (1.0) | MDI (2.9) | BD (1.8) | 430 | 0.016 | 0.90 | 63 | 102 |
| Comp. Ex. 1 | Polyester diol B (1.0) | MDI (2.9) | BD (1.8) | 510 | 0.002 | 0.89 | 44 | 52 |
| Comp. Ex. 2 | Polyester diol D (1.0) | MDI (2.9) | BD (1.8) | 350 | 0.006 | 0.25 | 58 | 78 |
| Comp. Ex. 3 | Polyester diol E (1.0) | MDI (1.9) | BD (1.8) | 310 | 0.008 | 0.15 | 52 | 78 |
| Comp. Ex. 4 | Polyester diol I (1.0) | MDI (2.9) | BD (1.8) | 490 | 0.003 | 0.90 | 50 | 66 |
| Comp. Ex. 5 | Polyester diol J (1.0) | MDI (2.9) | BD (1.8) | 500 | 0.002 | 0.90 | 43 | 51 |
| Comp. Ex. 6 | Polyester diol L (1.0) | MDI (2.9) | BD (1.8) | 490 | 0 | 0.65 | 50 | 28 |

TABLE 3-continued

|  | Polymer diol (mole) | Organic diisocyanate (mole) | Chain extender (mole) | Elongation (%) | Resistance to hot water R (g/d) | Instantaneous recovery ratio | Long chain hard segment content (%) | Retention of long chain hard segment content after melt heating, (%) |
| --- | --- | --- | --- | --- | --- | --- | --- | --- |
| Comp. Ex. 7 | Polyester diol M (1.0) | MDI (2.9) | BD (1.8) | 400 | 0.004 | 0.58 | 55 | 75 |
| Comp. Ex. 8 | Polyesterpolycarbonate diol Q (1.0) | MDI (2.9) | BD (1.8) | 440 | 0.003 | 0.88 | 51 | 63 |
| Comp. Ex. 9 | Polyesterpolycarbonate diol T (1.0) | MDI (2.9) | BD (1.8) | 450 | 0.002 | 0.85 | 42 | 52 |

FIG. 1 shows the GPC chart of the polyurethane obtained in Example 9 as an example of chain length distribution of hard segments. The numbers at the peaks in FIG. 1 show the number of repetition of combined units of 4,4'-diphenylmethane diisocyanate (MDI) and butanediol (BD) which is the basic component of the hard segments. The peak 5 includes all units repeating at least 5 times.

The structures of hard segments shown by 0 through 5 in FIG. 1 are as follows.

| 0: MPD-MDI-MPD | (n = 0) |
| --- | --- |
| 1: MPD-(MDI-BD)$_1$-MID-MPD | (n = 1) |
| 2: MPD-(MDI-BD)$_2$-MID-MPD | (n = 2) |
| 3: MPD-(MDI-BD)$_3$-MID-MPD | (n = 3) |
| 4: MPD-(MDI-BD)$_4$-MID-MPD | (n = 4) |
| 5: MPD-(MDI-BD)$_n$-MID-MPD | (n ≧ 5) |

The peak area fractions (%) of hard segment chain length distribution are as follows.

| n ≧ 5 | n = 4 | n = 3 | n = 2 | n = 1 | n = 0 |
| --- | --- | --- | --- | --- | --- |
| 37 | 13 | 12 | 14 | 13 | 11 |

Then, the long chain hard segment content in this case becomes $37+13+12=62(\%)$.

Comparative Examples 1 through 9

Example 1 was repeated to prepare polyurethanes having compositions as shown in Table 3. They showed very poor properties, including not only resistance to hot water but also instantaneous elastic recovery and elongation. It is apparent that they cannot used in combination with polyester fibers, which is contrary to the elastic polyurethane fiber of the present invention.

EXAMPLE 12

The elastic fiber obtained in Example 1 was knitted into a knit fabric with a circular knitting machine (gauge 20). The knit fabric was dyed under the following conditions.

Scouring under relaxation: at 80° C. for 1 min.

| Dyeing | |
| --- | --- |
| Dyeing machine: Drum type dyeing machine | |
| Dye: Sumikaron Red E-RPD (quinone-type, made by Sumitomo Chemical Co., Ltd.) | 2.0% owf |
| Dispersion assistant: Disper TL (manufactured by Meisei Chemical Co., Ltd.) | 1 g/liter |
| PH regulator: Ammonium sulfate | 1 g/liter |
| Acetic acid | 1 g/liter |
| Bath ratio: | 1:30 |
| Dyeing temperature: Temperature elevated from 40 to 130° C. over 30 minutes and kept at this point for 30 minutes | |

| -continued | |
| --- | --- |
| Reduction cleaning | |
| Reduction liquor composition: | |
| Soda hydrosulfite | 3 g/liter |
| Soda ash | 2 g/liter |
| Amiladin (made by Dai-Ichi Kogyo Seiyaku Co., Ltd.) | 1 g/liter |
| Bath ratio: | 1:30 |
| Cleaning temperature: | 80° C. × 20 min |

After the reduction cleaning, the fabric was sufficiently washed with water, dried and tested for color fastnesses. As given below, all of the color fastnesses tested were good, all clearing Class 3 which is generally required for clothing.

Color fastness to washing (JIS L-0844 A2 method): Class 4 to 5 (discoloration)

Color fastness to water (JIS L-0846 B method): Class 4 to 5 (discoloration)

Color fastness to perspiration (JIS L-0848 A method): Class 4 to 5 (discoloration)

Color fastness to light (JIS L-0842 Carbon arc 3rd exposure method): Class 4 to 5

Industrial Applicability

The elastic polyurethane fiber of the present invention is, as described heretofore, dyeable under high-temperature and high pressure conditions and is hence usable in combination with polyester fibers that have been unusable with elastic polyurethane fiber. Accordingly, the fiber of the present invention can be processed into core yarns covered with polyester fibers dyeable at high temperatures or fabrics comprising polyester fibers and the elastic polyurethane fiber.

These items have the following industrial applicability.

Clothing: swimsuits, skiwears, cycling wears, leotards, lingeries, foundation garments and underwears;

Clothing-miscellaneous: panty-hoses, stockings, caps, gloves, power-nets and bandages Non-clothing: gut for tennis racket, ground thread for integrally molded car seat and metal-covered yarn for robot arm.

We claim:

1. An elastic polyurethane fiber comprising a polyurethane obtained by copolymerizing a polymer diol (A) an organic diisocyanate (B) and a chain extender (C);

said polymer diol (A) that constitutes the polyurethane being a polyester diol and/or polyesterpolycarbonate diol having an average molecular weight of 1,000 to 6,000, and satisfying the following condition (I);

$$5.4 \leq \frac{\text{total number of carbon atoms}}{\text{numbers of ester bonds and carbonate bonds}} \leq 10.0 \quad (I)$$

wherein the total number of carbon atoms means the number of the carbon atoms contained in the polymer diol and excluding those contained in the ester bonds and carbonate bonds thereof;

the diol units that constitute said polymer diol containing branched diols in an amount of at least 10 mol%;

said polyurethane constituting said elastic fiber satisfying the following conditions (II) and (III)

$$45\% \leq \text{long chain hard segment content} \leq 75\% \quad (II)$$

wherein the long chain hard segment content means the ratio of the amount of long chain hard segments containing at least 3 repeating units from (B) and (C) combinedly, to the amount of total hard segments comprising components (B) and (C) and, linked thereto via urethane bonds, the terminal diol component of (A), the amounts of said three components being determined on the three components taken out by alcoholysis of component (A) of said polyurethane with an alkali-reethanol solution;

$$\frac{\text{Retention of long chain hard segment}}{\text{content after heat melting}} \geq 85\% \quad (III)$$

wherein the retention of long chain hard segment content after heat melting means the ratio between the contents of long chain hard segments after and before melt-kneading at 230° C. for 60 minutes of said polyurethane constituting said elastic fiber.

2. An elastic polyurethane fiber according to claim 1 wherein said branched diols are those having at least one methyl branch and at least 4 carbon atoms.

3. An elastic polyurethane fiber according to claim 1, wherein said branched diols are those having one methyl branch and at least 6 carbon atoms.

4. An elastic polyurethane fiber according to claim 1 further having a stress of at least 0.0075 g/denier after being treated in the state of 200% elongation and in hot water at 130° C. for 30 minutes.

5. An elastic polyurethane fiber according to claim 1, further having an instantaneous elastic recovery of at least 0.8.

6. An elastic polyurethane fiber according to claim 4, further having an instantaneous elastic recovery of at least 0.8.

7. An elastic polyurethane fiber according to claim 1, further having a retention of long chain hard segment content after heat melting of at least 90%.

8. An elastic polyurethane fiber according to claim 1 further containing at least 0.01% by weight of a disperse dye having dyeing power.

9. An elastic fiber comprising a polyurethane utilizing a polymer diol satisfying the following conditions $$0 < k \leq 0.0652X - 0.152 \ (5.4 \leq X \leq 10)$$

wherein k means the apparent rate constant of reaction of said polymer diol with 4,4'-diphenylmethane diisocyanate (MDI) and X means (the total number of carbon atoms of said polymer diol)/(the numbers of ester bonds and carbonates bonds present in said polymer diol).

* * * * *

UNITED STATES PATENT AND TRADEMARK OFFICE
CERTIFICATE OF CORRECTION

PATENT NO. : 5,310,852

DATED : May 10, 1994

INVENTOR(S) : Hirai et al

It is certified that error appears in the above-indentified patent and that said Letters Patent is hereby corrected as shown below:

In the Abstract, second column, line 32:
    "alkali-reethanol" should read --alkali-methanol--.

In Column 2, lines 14-15:
    "alkaliree-thanol" should read --alkali-methanol--.

In Column 2, Figure 1, lines 40-45:
    "MID" should read --MDI-- all occurances.

In Column 5, line 14:
    "reethanol" should read --methanol--.

UNITED STATES PATENT AND TRADEMARK OFFICE
CERTIFICATE OF CORRECTION

PATENT NO. : 5,310,852
DATED : May 10, 1994
INVENTOR(S) : Hirai et al

It is certified that error appears in the above-indentified patent and that said Letters Patent is hereby corrected as shown below:

In Column 6, line 6:
"2-methyl1,3-propanediol," should read --2-methyl-1,3-propane diol--.

In Column 14, Table 2, Number average molecular weight, Ref. Ex.6:
"2000" should read --3500--.

In Column 15, Figure 1, lines 26-30:
"MID" should read --MDI-- all occurances.

In Column 17, line 26-27:
"alkali-reethanol" should read --alkali-methanol--.

Signed and Sealed this

Twentieth Day of December, 1994

BRUCE LEHMAN

*Attest:*

*Attesting Officer*    *Commissioner of Patents and Trademarks*